United States Patent Office

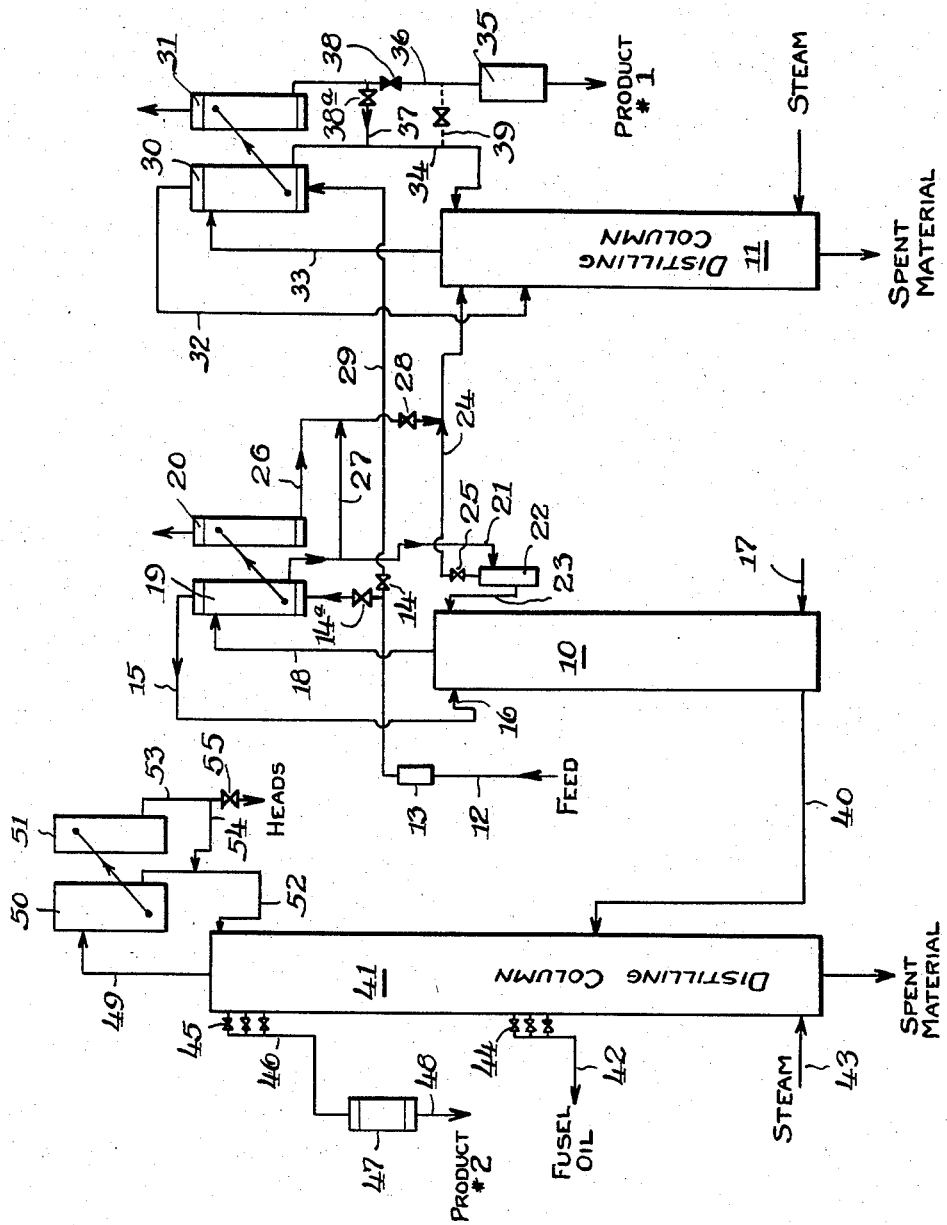

2,880,091
Patented Mar. 31, 1959

2,880,091

PROCESS FOR PRODUCING ALCOHOLIC BEVERAGE OF CONTROLLED CONGENER CONTENT

George C. Neureuther, Morton, Ill., assignor to Hiram Walker & Sons, Inc., Peoria, Ill.

Application March 5, 1958, Serial No. 719,356

10 Claims. (Cl. 99—34)

The present invention relates to the production of distilled, potable, alcoholic liquors such as whiskies, brandies and the like from fermented alcoholic stocks such as beers and wines. More particularly, it relates to improvements in processes for distilling potable alcoholic liquors in which the quality and characteristics of the distilled product may be controlled in continuous operation and the congeneric content of the distilled product is controlled to assure a final product of the desired characteristics.

Certain of the characteristics of distilled liquors are dependent upon the composition of the alcoholic fermented material from which they are produced. These alcoholic starting materials may be distillers' beers, derived by fermentation of grains or mixtures of grains, starchy materials such as potatoes and rice or they may be fermented fruit juice products such as grape wine or other fermented juices. Since the present invention is applicable to the production of any of these distilled products, such as whiskies, brandies and the like, the distilled products generally will hereinafter be referred to as whiskies and the fermented liquids from which they are distilled as beers.

When preparing whiskies by continuous distillation process, it is desirable to have in the final distillate certain proportions of the congeners of the alcoholic fermentation process, the congeners being controlled and maintained constant in order to secure a uniform product having the desired characteristics of body, bouquet, flavor and composition. In general, distillation whiskies are delineated as light or heavy depending upon the body, bouquet and flavor imparted to the distilled product by its congener content. Production of "heavy" whiskies of uniform character and in large volume by the continuous method, retaining the desirable congeners of the alcoholic fermentation process is a primary object of this invention.

It is not only desirable that the final or distilled product be heavier in congeneric content but, for uniform body, bouquet and flavor, that the congeneric balance be approximately in the same ratios as that produced by conventional methods for differences will be readily apparent upon testing organoleptically. By operating in accordance with the present invention, after the desired characteristics have been established, this result may be secured with uniformity and constancy.

In carrying out the process of the present invention feed material, such as beers having 2% to 7% by volume alcoholic content is split, one portion being fed to a fractionation operation for distilling congeners and the other portion is delivered to a final distillation or rectifying operation. Upon distilling beer plus congener condensate in the rectifying column a product is obtained which will contain all of the congenerics of whiskey produced in the conventional manner in the normal balance, but the congenerics will be present in higher concentrations. The bottoms from the congener distilling operation, generally containing 3% to 5% alcohol, are sent to a distillation operation from which is produced neutral spirits or "light" whiskies.

More in detail, the method of continuously producing alcoholic beverage of controlled congener content in distillation apparatus comprises splitting the beer feed into two portions. The first portion of the beer is heated in a fractionating column to vaporize congeners and some alcohol. This fractionating column may be operated under condiitons varying from those which will vaporize substantially all of the fusel oil to those under which substantially all of the fusel oil is discharged with the alcohol-containing bottoms. Preferably, a substantial portion of the fusel oil is vaporized with the lighter congeners. Vapors are condensed and all or part of the alcohol fraction returned to the fractionating column as reflux. Congeners, with or without some condensed alcohol, are delivered to a second distillation or rectifying column where the condensed congeners or congeners plus alcohol delivered from the fractionating column and the second portion of the beer feed are rectified in a second or joint distilling operation. This operation is carried out under conditions to vaporize a distillate product having an alcohol content corresponding to the alcohol in that fraction of the beer fed to the second distilling operation plus that delivered to the second distilling operation with the congeners. Congeneric content of this distillate product will correspond substantially to that of the total amount of beer fed to the system if substantially all of the congeners vaporized in the first distilling operation are delivered to the second distilling operation, and will be correspondingly less if only part of the condensed congeners from the first distillation are delivered to the second distillation or rectifying column. Liquid produced by condensation of the rectifying column vapors is a whiskey having the congeners in normal balance, but in higher concentration than is found in whiskies produced by conventional methods. The bottom product of this rectifying column is a spent beer.

Liquid removed from the bottom of the fractionating column contains most of the alcohol present in the portion of the beer fed to this fractionating column. This liquid is fed to a distillation column at a point intermediate the fusel oil drawoff and bottom of the column. In the distillation column provided with a sufficient number of plates to produce either a high strength alcohol or a lower proof beverage alcohol of very light congeneric content, the liquid is heated to vaporize some alcohol and "heads" which contain a small amount of aldehydes.

Liquids produced by condensing the alcohol vapors are returned to the top of the distillation column as reflux. "Heads" may or may not be condensed for return to the column depending upon the character of the end product desired.

A high alcohol content liquor is withdrawn from the upper portion of the distillation column. Lower down in the column, at a point intermediate the feed inlet and the alcoholic liquor drawoff, fusel oil accumulates and is withdrawn as a liquid sidestream. Spent beer liquid is discharged from the bottom of the distillation column with an alcohol content of less than about 0.1%.

The invention will be more fully understood from the following description and the accompanying drawing in which is shown in diagrammatic form an arrangement of apparatus suitable for carrying out the invention.

Referring to the drawing, the numerals 10 and 11 indicate distilling columns of conventional character provided internally with suitable fractionating plates, such as bubble plates, sieve plates and the like. Beer or wine, i.e., the fermented alcoholic liquid to be distilled, is supplied in part to each of these columns. The beer is conducted, from a storage source not shown, through pipe 12, provided with suitable volume control device 13 such as a flow meter, to the point for splitting into feed portions for each of the columns.

Part of the beer flowing in pipe 12 is diverted by suitable valving means 14 and 14a and caused to pass in suitable heat exchange relationship with higher temperature materials such as the vapors from the fractionating column 10. After preheating, this portion of the beer flows through pipe 15 and is supplied to column 10 at a point 16 adjacent the top thereof. The temperature of this feed beer may vary from about 90° F. to about 170° F.

Heat is supplied to the column 10 at its base in the form of open or closed steam or a combination of both, as indicated at 17. The temperature at the base of column 10 may vary considerably depending upon the products being distilled but in general may suitably be in the range between about 205° F. and 215° F. Vapors are discharged from the top of column 10 and condensed by heat exchange with the feed. These vapors are conducted through conduit 18 and then successively through heat exchanger 19 and condenser 20 which are of the conventional type in which vapors are cooled while either the beer or water is preheated. The vapors passing through conduit 18 contain between about 60% and 75% alcohol depending upon the nature of the feed and recycle streams, and the temperature at the top of column 10. That portion of the condensate fed back to the top of column 10 establishes the composition on the top plates of column 10 and the steam utilized for heating is introduced in quantities to drive all or any desired portion of the congeners off as vapors. The recycle condensate usually contains between about 60% and 70% by volume of alcohol.

Condensate formed in condenser 19 is passed through pipe 21 to a condensate accumulator 22. This condensate may or may not form a two phase system. If the condensate forms a single liquid phase, a portion thereof is returned to the top of column 10 as reflux. If a two phase system is accumulated in decanter 22, all or some portion of the heavy phase is returned to the top of column 10 through pipe 23 to serve as reflux therein. The liquid not returned as reflux is delivered through pipe 24 to a point adjacent the top of column 11. The condensate from condenser 20 passes out of the bottom thereof through the line 26. Condensate from condenser 20 joins a split portion of the condensate from heat exchanger 19 flowing in pipe 27 and the combined liquids flow, under volume control of valve 28, to join liquid in pipe 24 as feed to column 11. These streams combined into one for feeding to column 11 constitute between about 20% and about 25% of the volume of the alcohol fed to column 10. The proportion of this condensate returned to the top of column 10 and the boiling point of the composition maintained on the top plate of column 10 directly affects the congeneric content of the feed to column 11.

The quantity of steam delivered at the base of column 10 and the composition and quantity of reflux will determine the composition and concentration of the congeners in the condensate.

The temperature at the top of column 10 is controlled to be within the range between about 185° F. and about 195° F. so that the vapors leaving the column through pipe 18 contain between about 60% and 75% alcohol.

By control of the valve 14, a portion of the feed or beer is diverted to column 11. This feed stock passes through line 29 and is preheated by heat exchange with vapors from column 11. The preheated beer passes through the heat exchanger 30, the first stage of condensation for vapors from column 11. Vapors, not condensed in heat exchanger 30, thereafter pass through condenser 31. Preheated liquor then passes through pipe 32 into the upper portion of column 11.

Vapors discharged from the top of column 11 pass through conduit 33 into heat exchanger 30. This vapor stream will have a proof between about 110 and about 160. Condensate from heat exchanger 30 is returned to the top of column 11 through pipe 34 for reflux. Vapors not condensed in heat exchanger 30 are further cooled in condenser 31 and the condensate formed is passed to product cooler 35 through pipe 36. Pipe 36 is connected to line 34 by means of by-pass pipe 37. Through control of valving means 38 and 38a any desired proportion of the condensate from the condenser 31 may be introduced into line 34 to join the condensate from heat exchanger 30 and thus be returned to column 11. Alternatively, pipes 34 and 36, may be connected by a pipe 39 and suitable valves for liquid flow control to permit diversion of any desired proportion of the condensate from condenser 30 into line 36 to join the condensate from condenser 31 in producing product No. 1 of this distillation system. This product generally has a proof in the range of about 110 to about 160.

The relative proportions of condensate diverted to column 11 as column feed and the relative proportions of distilling material or beer fed to column 11 will directly influence the characteristics of the product from column 11.

The quantity of steam and the temperature thereof introduced at the bottom of column 11 will determine the composition of the distillate and concentration of congeners therein. By maintaining a temperature during, for example, whiskey distillation in the range of 225° F. to 230° F. at the bottom of column 11, the spent liquor withdrawn from the bottom of the column will have an alcohol content of less than 0.2%. By maintaining a temperature at the top of column 11 between about 180° F. and about 210° F. the alcohol content of the composition on the top plate will exceed about 45% by volume and generally exceed 55% by volume. The condensed vapors, i.e., vapors boiling at a temperature higher than about 60° F., the average mean effective temperature of the condenser 31, have a proof ordinarily in the range of 110 to 160 and contain aldehydes, esters and other volatile constituents.

In the operation of fractionating column 10, at least some and preferably all of the fusel oil constituents present in the liquid supplied as feed to this column through line 15 are removed as overhead vapors. The fusel oil which is not vaporized passes out of the column with the liquid bottoms being withdrawn therefrom. These bottoms are delivered through pipe 40 to column 41 at a point intermediate the fusel oil drawoff 42 and the bottom of the column. Steam either in open or closed system or both is introduced adjacent the bottom of column 41 as indicated at 43. A temperature in the range between about 220° F. and about 235° F. is maintained at the bottom of column 41. The fusel oil constituents of the feed accumulate in an intermediate portion of the fractionating column where the temperature is in the range between about 175° F. and about 195° F. if a top plate temperature of column 41 is in the range between about 170° F. and 180° F. depending upon the pressure on the system. A side stream containing these constituents is drawn off through one or more of the valved lines 44.

Column 41 is operated so that the desired distillate product which ordinarily has a proof in the range between about 160 to 195 and preferably in the range between about 188 and 192 is collected on the plates at a point adjacent the top of the column. The desired distillate product is drawn off from the column as a side stream through one or more of the valved lines 45 into manifold 46 and passes through the cooler 47 which is of conventional character. The cooled product passes out of the cooler 47 through line 48 by which it is conducted to suitable storage.

Vapors discharged from the top of the column 41 pass through line 49 to condensers 50 and 51. Condensate from column 50 is returned to the top of column 41 as reflux through pipe 52. Vapors condensed in condenser 51 pass through line 53 for discharge from the system or subject to the liquid flow control of valve 55, are delivered through line 54 to reflux line 52 for combining with the liquid therein.

The condensate from condenser 51 contains the light volatile congeners or heads distilled from the column 41. The proportion of this condensate returned to the column will give control over the character of product No. 2 of this distillation system. If part of this condensate is returned to the column, product No. 2 will be a higher proof beverage alcohol of very light congeneric content. If desired, all the condensate from condenser 51 may be removed from the system thereby permitting production at the top of column 41 of a neutral spirit.

Temperatures maintained at the top of column 41 vary with the product being distilled and the pressure on the system but for the production of a neutral spirit or light whiskey this temperature will be in the range between about 170° F. and 180° F. when utilizing a vacuum of 16 to 27" of mercury. Heads discharged from the system when producing a neutral spirit product show a small amount of aldehydes if the number of plates in column 41 is sufficient to produce a high strength alcohol.

The distillate product removed from the upper portion of column 41 is one having an alcohol content which approaches or may be higher than or lower than the alcohol content desired in the final distillate product of the system. Thus the side stream drawn off from column 41 may have an alcohol proof of about 100 to about 195.

The selection of the points from which products may be withdrawn when provided with multiple drawoff points is dependent upon the judgment of the operator and is generally determined by him upon the basis of the content of congeners and its effect upon the taste and flavor of the final product of column 41.

The invention may be further illustrated by description of the process with reference to preparation of whiskey without any intention that the invention be limited thereto.

Distiller's beer from grain mash is fed to column 10 at a rate of 4800 wine gallons per hour having an alcohol content of about 7%. Steam is introduced into the bottom of column 10 at a temperature of about 15 pounds per square inch gauge and at a rate of 10,000 pounds per hour. Beer is preheated in heat exchanger 19 at a temperature of 170° F. Condensate having an alcohol content of 60% to 70% by volume is recycled to the column as reflux and a quantity of liquid containing about 20% of the alcohol fed to the column initially plus volatile congeners is sent to column 11. This diverted liquid has a volume of about 90 gallons per hour of approximately 120 proof gallons when the distiller's beer feed is split fifty-fifty between columns 10 and 11. This stream will contain practically all of the volatile congener present in the feed to column 10.

Column 11, if supplied beer preheated to 170° F., has delivered to its top portion a total of approximately 4890 gallons, i.e. 4800 gallons of feed material plus 90 gallons of condensate. Reflux is supplied to the top of column 11 at a rate to maintain the discharge of vapors at a temperature of about 192° F. These vapors when condensed are a whiskey product of approximately 160 proof having all the congeners of the whiskey in normal balance but it will contain them in a higher concentration. In this instance where the feed was split fifty-fifty between columns 10 and 11 the congeneric content of the whiskey will be a little less than twice the amount that would have been attained had the original beer all been distilled in column 11.

By operation in accordance with the present invention, the composition and quality of the "heavy" whiskey distillate may be adequately controlled within broad limits and a uniform product possessing desired characteristics may be obtained in continuous operation. Further, the objectionable recycling of prior methods of operation and the lack of uniformity in products which results from such recycling are avoided. In addition, the product of the rectifying column can be made heavier in congeneric content than the distillate from the original beer distilling would be.

Although the invention has been described in connection with specific embodiments thereof, it will be understood that these are not to be regarded as limitations upon the scope of the invention except insofar as included in the accompanying claims.

I claim:

1. The method of continuously producing alcoholic beverage of controlled congener content in distillation apparatus which comprises dividing beer to be distilled into two portions, distilling the first portion to remove congeners and a small portion of the alcohol therefrom, subjecting the congeners and the second portion of beer to distillation in a joint distilling operation in a rectifying column under conditions to vaporize an alcoholic distillate product having an alcohol content corresponding to the amount of beer fed to the joint distillation and a congener content corresponding substantially to that of the total amount of beer fed to both distilling operations.

2. The method as set forth in claim 1 wherein the first distillation is operated to remove as a bottom fraction, the alcoholic liquid from which congeners have been removed, said alcoholic fraction having an alcohol content corresponding substantially to the first portion of beer distilled.

3. The method of continuously producing alcoholic beverage of controlled congener content in distillation apparatus which comprises supplying a portion of the beer to a fractionating column while supplying heat to said fractionating column, supplying the remainder of said beer to a rectifying column while supplying heat to said rectifying column, distilling the beer in the fractionating column to produce vapors of alcohol accompanied by light congeners, subjecting the vapors to condensation whereby said alcohol and light congeners are rendered liquid, returning a portion of said liquid to the fractionating column as reflux, discharging the remainder of said liquid to the rectifying column, distilling the remainder of said liquid together with the portion of beer supplied thereto in said rectifying column, removing from said rectifying column vapors condensible to an alcohol product of desired characteristics, removing from the bottom of said fractionating column an alcoholic liquid and supplying it to a distillation column while supplying heat to said distillation column, removing from the intermediate portion of said distillation column a side stream containing fusel oil, withdrawing from the upper portion of said distillation column a distillate side stream of high alcohol content, vaporizing low boiling constituents from said distillation column to remove at least a portion thereof from the system and refluxing a high alcohol content condensate produced from said vapors to the upper portion of said distillation column.

4. The method of continuously producing alcoholic beverage of controlled congener content which comprises supplying a portion of a beer to be distilled to a fractionating column while supplying heat to said fractionating column, supplying the remainder of said beer to a rectifying column while supplying heat to said rectifying column, distilling beer in the fractionating column to produce vapors of alcohol accompanied by light congeners, subjecting the vapors to condensation in stages to produce a predominantly alcohol fraction and a predominantly light congener fraction, returning a portion of the predominantly alcohol fraction to the fractionating column as reflux, supplying the remainder of the predominantly alcohol fraction and the light congener fraction to the rectifying column for distillation therein with the portion of the beer supplied thereto, distilling alcohol and congeners in said rectifying column, removing from said rectifying column vapors condensible to an alcohol product of desired characteristics, removing from the bottom of said fractionating column an alcoholic liquid and supplying it to a distillation column while supplying heat to said distillation column, vaporizing low boiling constituents from said distillation column and withdrawing from the upper portion of said distillation column a distillate side stream of desired alcohol content.

5. The method as set forth in claim 4 wherein the congeners are substantially completely removed from the beer fed to the fractionating column and the alcoholic distillate product removed from the rectifying column has a congener content consisting of substantially all of the congeners removed from the beer fed to the fractionating column plus the congeners derived from the beer fed to the rectifying column.

6. The method of continuously producing alcoholic beverage of controlled congener content which comprises supplying a portion of a beer to be distilled to a fractionating column while supplying heat to said fractionating column, supplying the remainder of said beer to a rectifying column while supplying heat to said rectifying column, distilling beer in the fractionating column to produce vapors of alcohol accompanied by light congeners, subjecting the vapors to condensation in stages to produce a predominantly alcohol fraction of 60% to 70% alcohol by volume and a predominantly light congener fraction, returning a portion of the predominantly alcohol fraction to the fractionating column as reflux, supplying the remainder of the predominantly alcohol fraction and the light congener fraction to the rectifying column for distillation therein with the portion of the beer supplied thereto, distilling alcohol and congeners in said rectifying column, removing from said rectifying column vapors condensible to an alcohol product of desired characteristics, removing from the bottom of said fractionating column a liquid containing a major proportion of the alcohol contained in the beer feed to said fractionating column and supplying it to a distillation column while supplying heat to said distillation column, vaporizing low boiling constituents from said distillation column and withdrawing from said distillation column a distillate side stream of desired alcohol content.

7. The method of continuously producing whiskey of controlled congener content in distillation apparatus which comprises supplying a portion of the beer to a fractionating column while supplying heat to said fractionating column, supplying the remainder of said beer to a rectifying column while supplying heat to said rectifying column, distilling the beer in the fractionating column to produce vapors of alcohol accompanied by light congeners, subjecting the vapors to condensation whereby said alcohol and light congeners are rendered liquid, returning a portion of said liquid to the fractionating column as reflux, discharging the remainder of said liquid to the rectifying column, distilling the remainder of said liquid together with the portion of beer supplied thereto in said rectifying column, removing from said rectifying column vapors condensible to a whiskey of desired characteristics, removing from the bottom of said fractionating column an alcoholic liquid and supplying it to a distillation column while supplying heat to said distillation column, removing from the intermediate portion of said distillation column a side stream containing fusel oil, withdrawing from the upper portion of said distillation column a distillate side stream of high alcohol content and vaporizing low boiling constituents from said distillation column to remove at least a portion thereof from the system.

8. The method of continuously producing whiskey of controlled congener content which comprises supplying a portion of a beer having an alcohol content of 2% to 7% to a fractionating column while supplying heat to said fractionating column, supplying the remainder of said beer to a rectifying column while supplying heat to said rectifying column, distilling beer in the fractionating column to produce vapors of alcohol accompanied by light congeners, subjecting the vapors to condensation in stages to produce a predominantly alcohol fraction of 60% to 70% alcohol by volume and a predominantly light congener fraction, returning the predominantly alcohol fraction to the fractionating column as reflux, supplying the predominantly light congener fraction to the rectifying column for distillation therein with the portion of the beer supplied thereto, removing from said rectifying column vapors condensible to a heavy whiskey of desired congener content, removing from the bottom of said fractionating column an alcoholic liquid and supplying it to a distillation column while supplying heat to said distillation column, vaporizing low boiling constituents from said distillation column, withdrawing from the upper portion of said distillation column a substantially neutral spirit side stream product and withdrawing from the bottom of said distillation column a spent beer liquor.

9. The method of continuously producing whiskey of controlled congener content which comprises supplying a portion of a beer having an alcohol content of 2% to 7% to a fractionating column while supplying heat to said fractionating column, supplying the remainder of said beer to a rectifying column while supplying heat to said rectifying column, distilling beer in the fractionating column to produce vapors of alcohol accompanied by light congeners, subjecting the vapors to condensation in stages to produce a predominantly alcohol fraction of 60% to 70% alcohol by volume and a predominantly light congener fraction, returning at least a portion of the predominantly alcohol fraction to fractionating column as reflux supplying the predominantly light congener fraction to the rectifying column for distillation therein with the portion of the beer supplied thereto, removing from said rectifying column vapors condensible to a heavy whiskey of desired congener content, removing from the bottom of said fractionating column an alcoholic liquid and supplying it to a distillation column while supplying heat to said distillation column, vaporizing low boiling constituents from said distillation column to remove at least a portion of the heads from the system, returning a condensed portion of the heads to the system as reflux and withdrawing from the upper portion of said distillation column a light whiskey of desired alcohol content.

10. The method as set forth in claim 9 wherein a fusel oil side stream is withdrawn from said distillation column at a point intermediate the feed and the point of removal of the distillate alcohol side stream.

References Cited in the file of this patent
UNITED STATES PATENTS

| | | |
|---|---|---|
| 969,332 | Brangier | Sept. 6, 1910 |
| 2,602,744 | Neureuther | July 8, 1952 |